Sept. 7, 1954  F. W. LIVERMONT ET AL  2,688,297
METHOD OF MAKING ONE-PIECE HOLLOW DOORKNOBS
Filed May 16, 1949  8 Sheets-Sheet 1
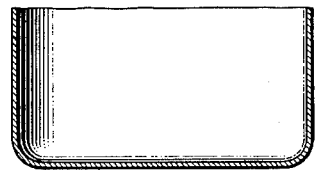
Fig.1.  Fig.2.
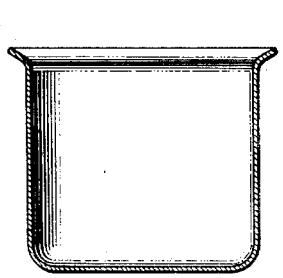 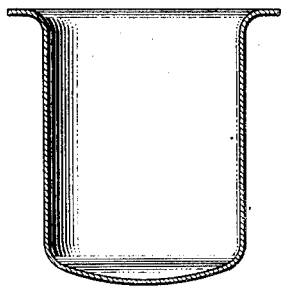 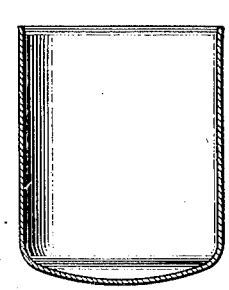
Fig.3.  Fig.4.  Fig.5.
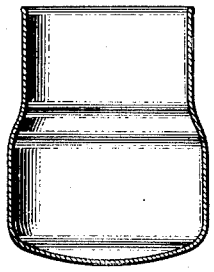 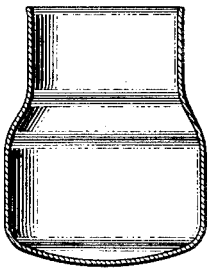 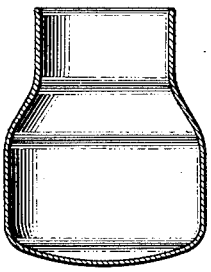 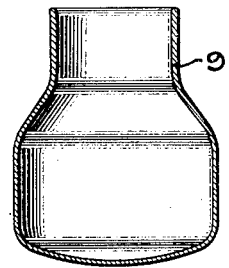
Fig.6.  Fig.7.  Fig.8.  Fig.9.
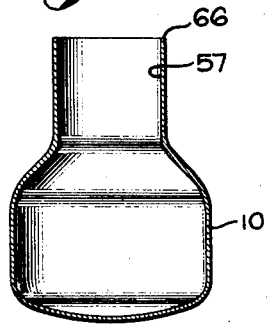 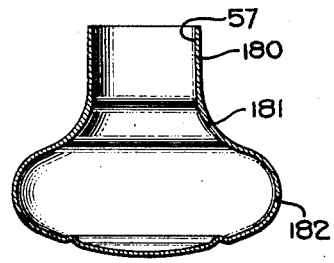
Fig.10.  Fig.11.
FRANK W. LIVERMONT
HARRY E. COLLINS
WILLIAM F. GRESHAM
INVENTORS
BY Lyon & Lyon
ATTORNEYS Sept. 7, 1954　　F. W. LIVERMONT ET AL　　2,688,297
METHOD OF MAKING ONE-PIECE HOLLOW DOORKNOBS
Filed May 16, 1949　　　　　　　　　　8 Sheets-Sheet 2
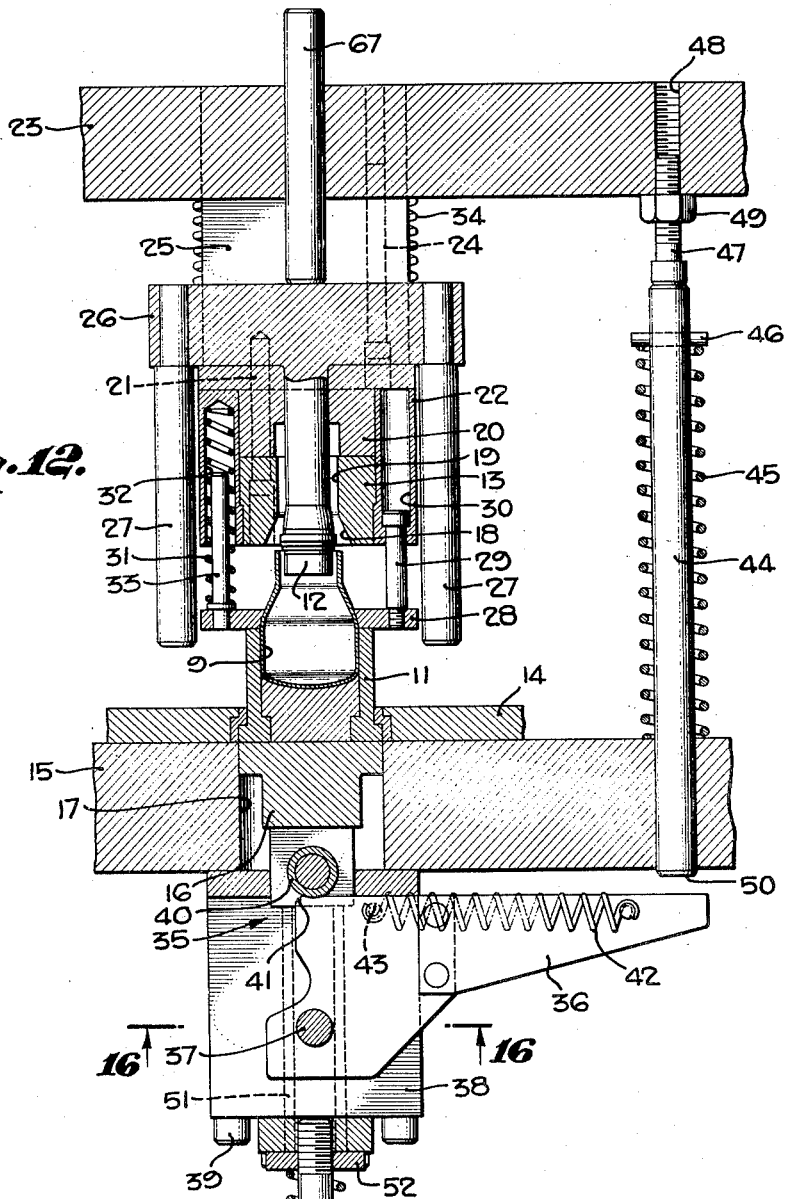
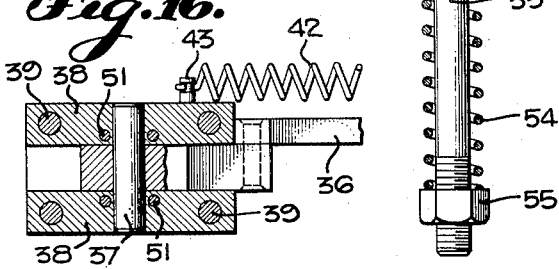
FRANK W. LIVERMONT
HARRY E. COLLINS
WILLIAM F. GRESHAM
INVENTORS
BY *Lyon+Lyon*
ATTORNEYS

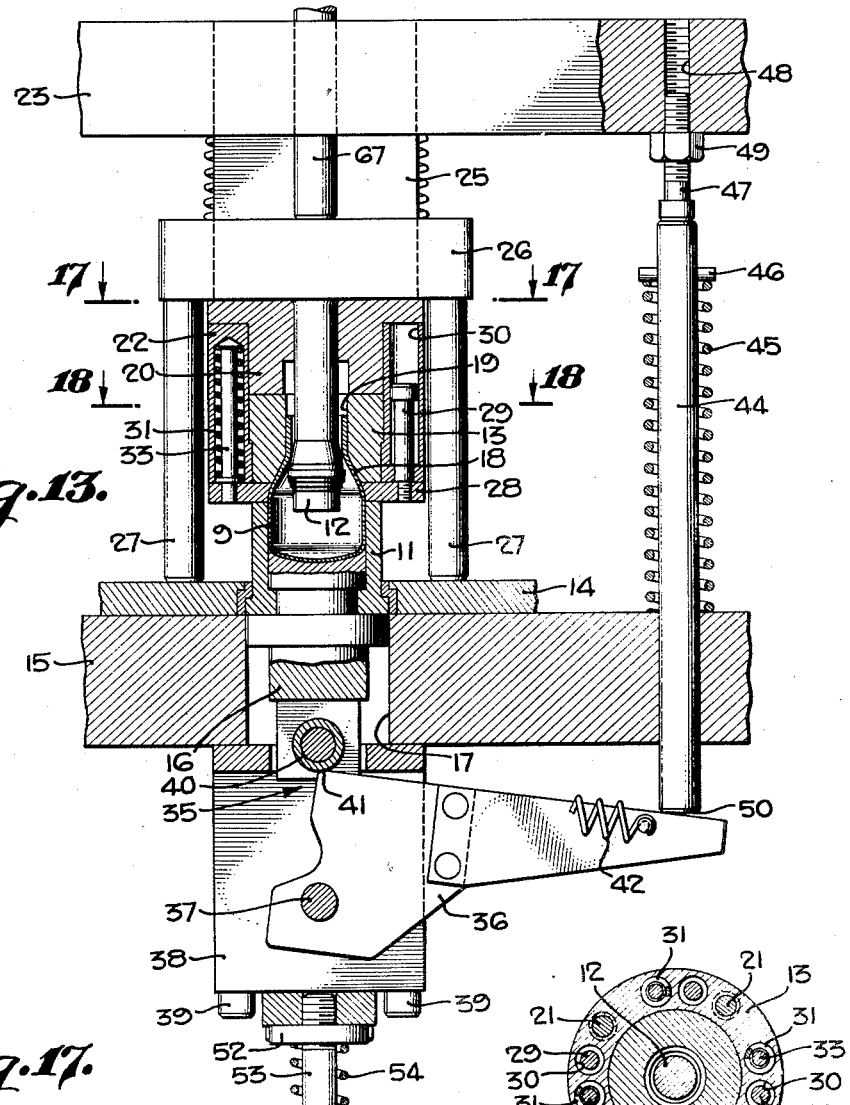
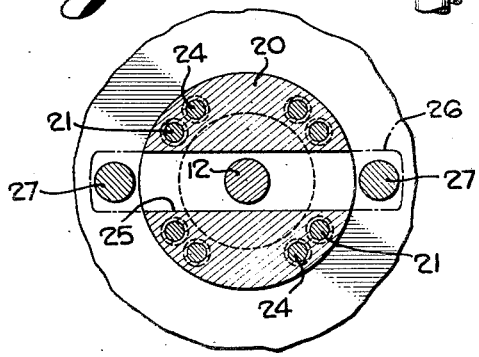
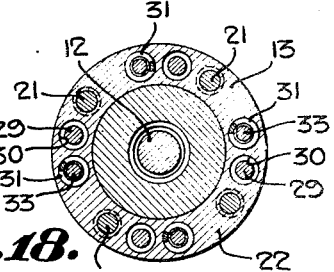

Sept. 7, 1954   F. W. LIVERMONT ET AL   2,688,297
METHOD OF MAKING ONE-PIECE HOLLOW DOORKNOBS
Filed May 16, 1949   8 Sheets-Sheet 4
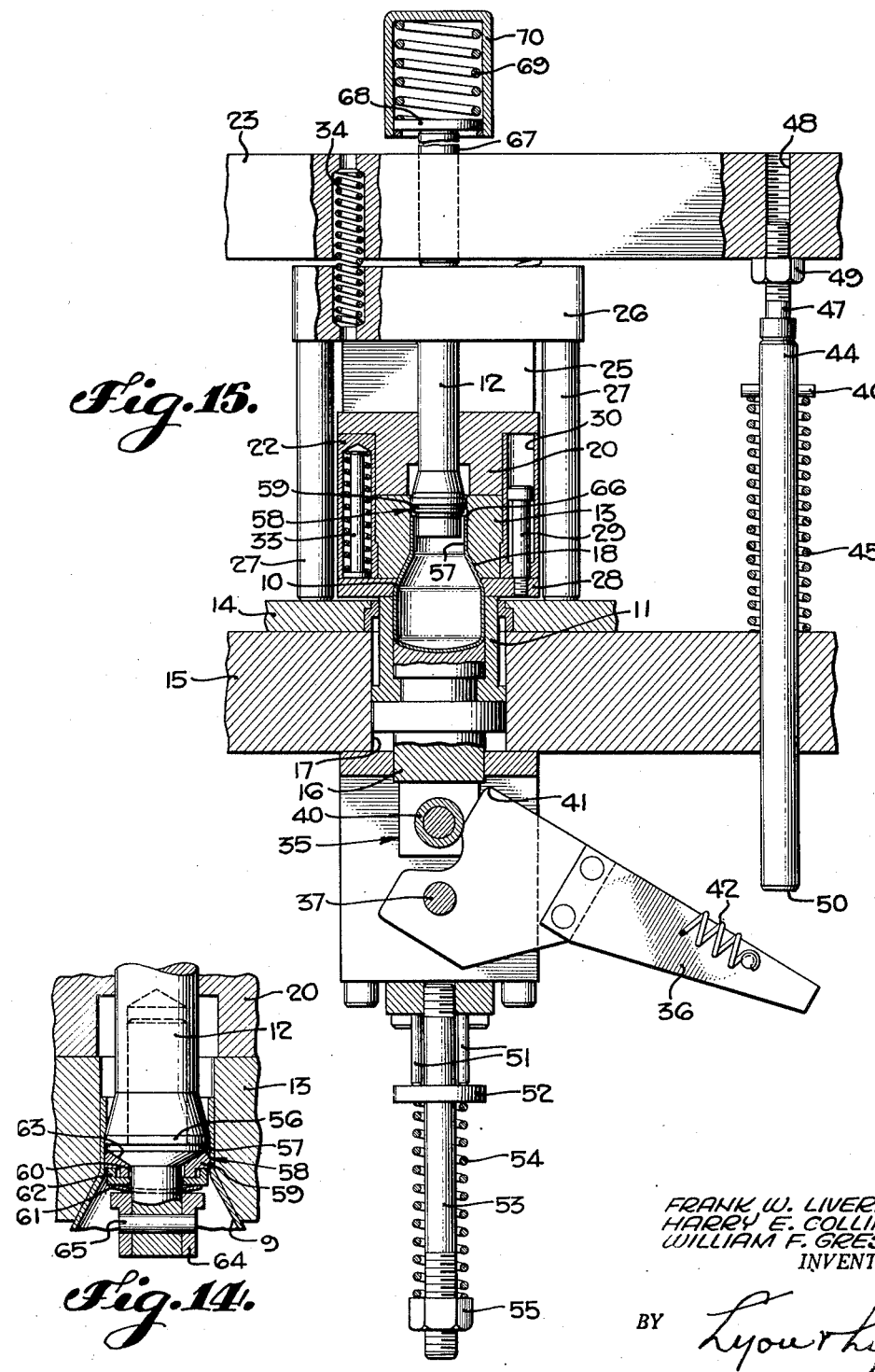
FRANK W. LIVERMONT
HARRY E. COLLINS
WILLIAM F. GRESHAM
INVENTORS
BY Lyon & Lyon
ATTORNEYS

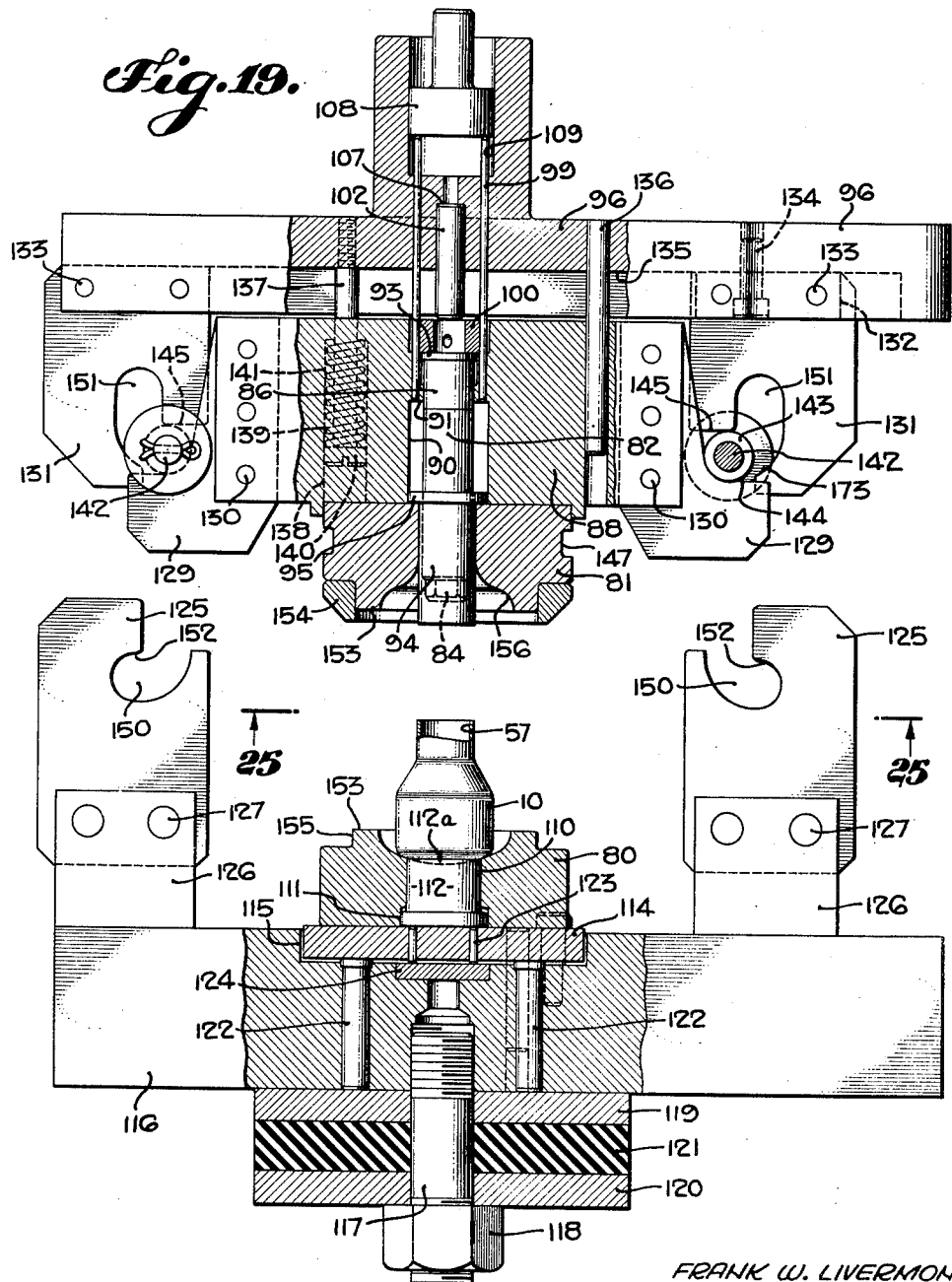

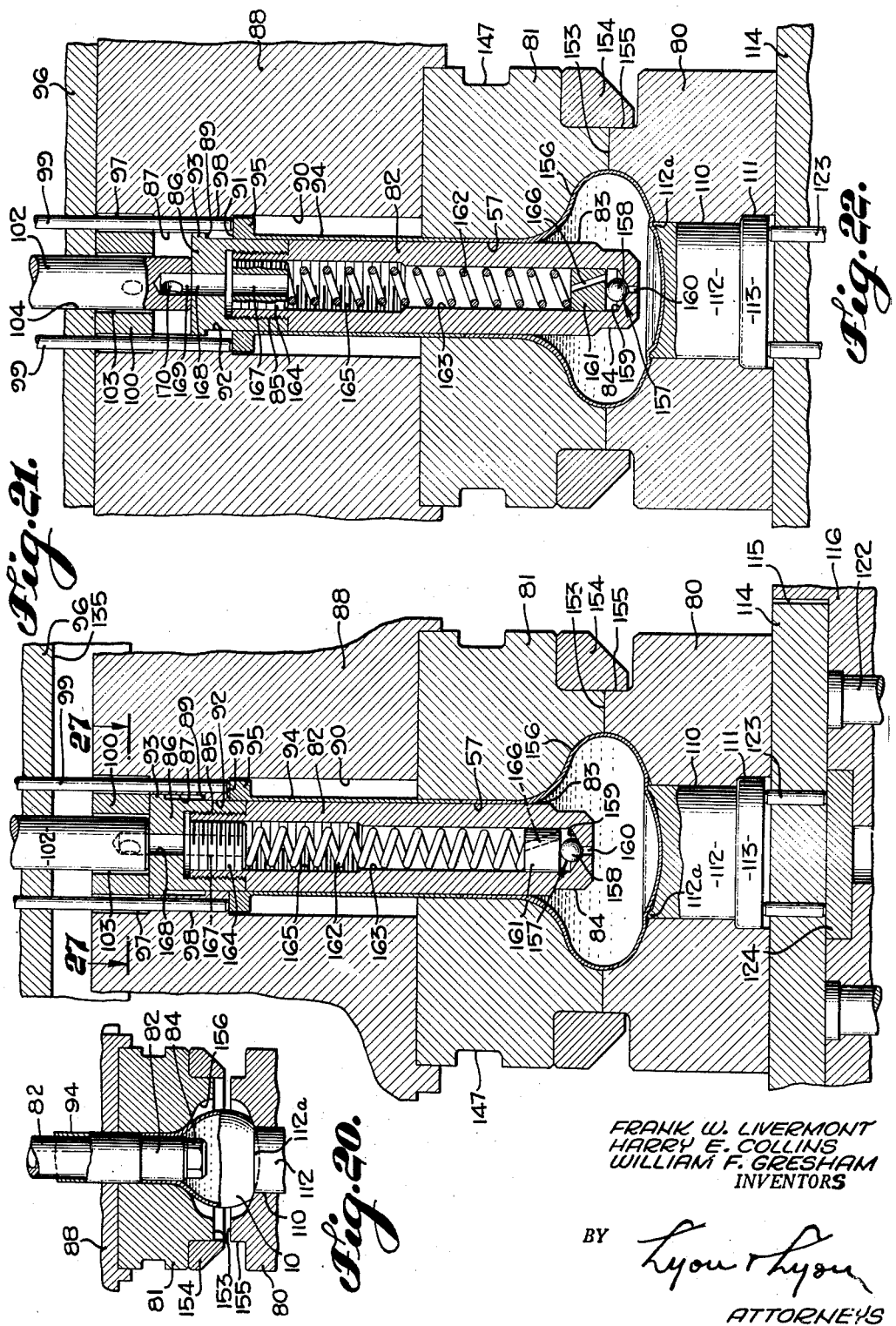

Sept. 7, 1954  F. W. LIVERMONT ET AL  2,688,297
METHOD OF MAKING ONE-PIECE HOLLOW DOORKNOBS
Filed May 16, 1949  8 Sheets-Sheet 7
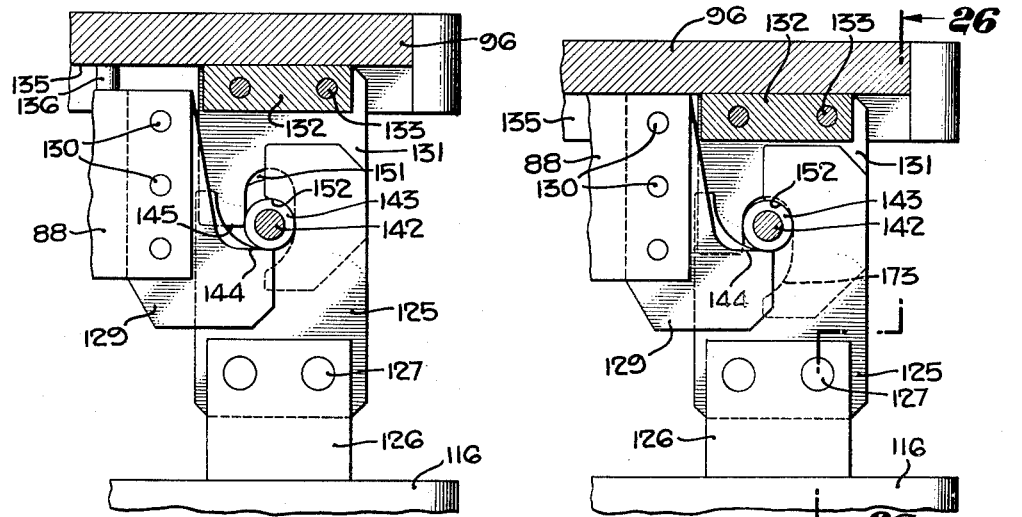
Fig. 23.  Fig. 24.
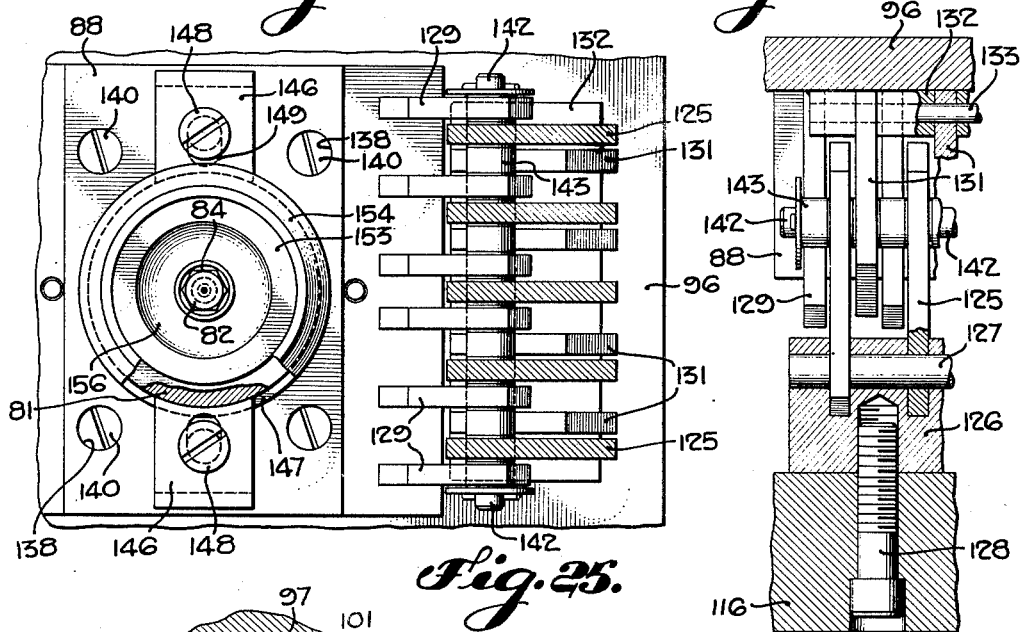
Fig. 25.  Fig. 26.
Fig. 27.
FRANK W. LIVERMONT
HARRY E. COLLINS
WILLIAM F. GRESHAM
INVENTORS
BY Lyon & Lyon
ATTORNEYS

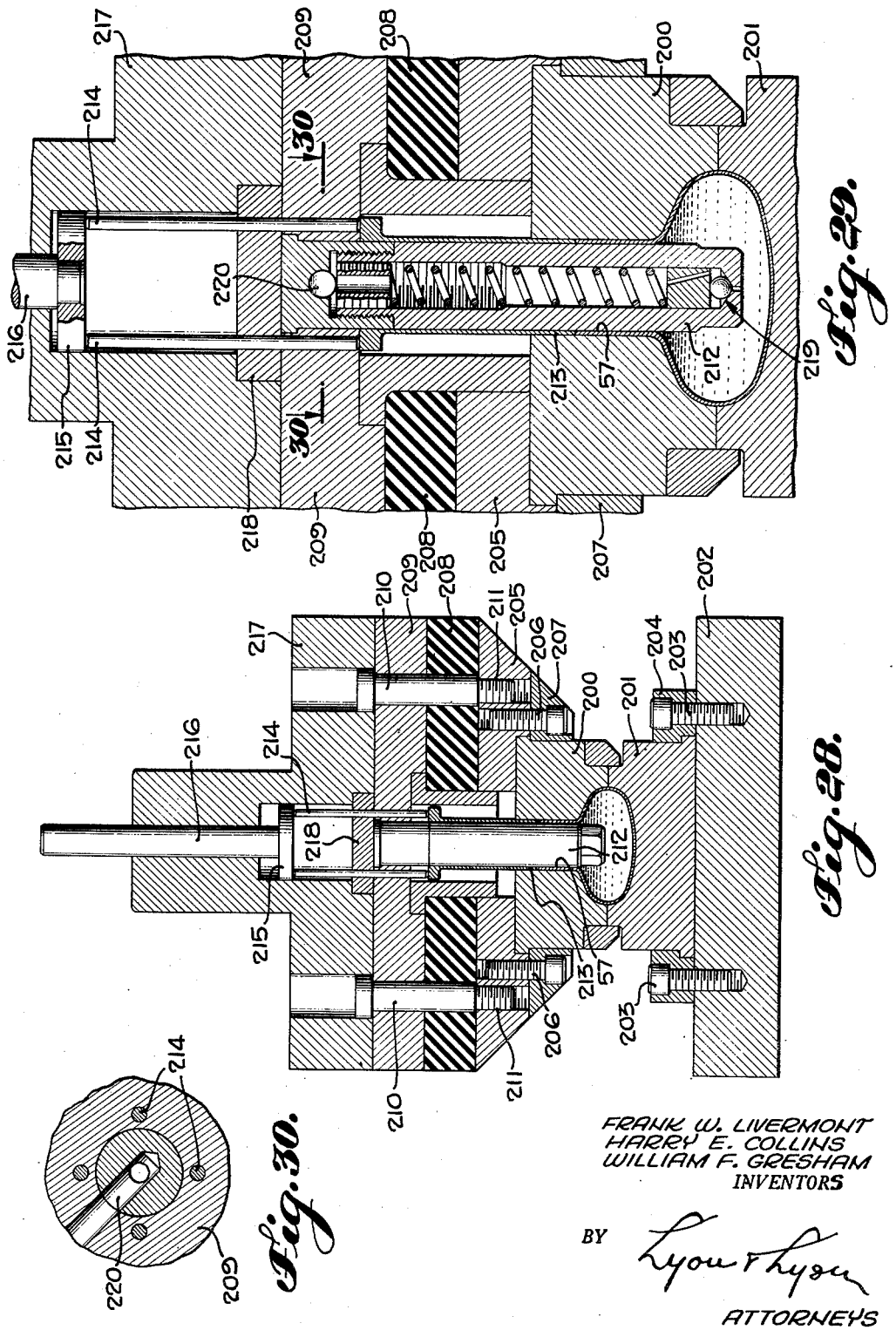

Patented Sept. 7, 1954

2,688,297

UNITED STATES PATENT OFFICE 2,688,297

METHOD OF MAKING ONE-PIECE HOLLOW DOORKNOBS

Frank W. Livermont, Duarte, Harry E. Collins, Los Angeles, and William F. Gresham, La Crescenta, Calif., assignors to Tubing Seal Cap, Inc., Los Angeles, Calif., a corporation of California Application May 16, 1949, Serial No. 93,524

7 Claims. (Cl. 113—51)

This invention relates to the art of metal stamping and processing, and is particularly directed to a method and apparatus of forming a bulbous part such as, for example, a door knob, and is also directed to a new and improved form of door knob construction.

It is an object of our invention to provide a method and apparatus adaptable to quantity production techniques for manufacture of hollow bulbous door knobs or the like from a continuous flat strip of material.

A more detailed object is to provide a new and improved method and apparatus for manufacture of a bulbous part using conventional punch presses.

Another object is to provide a method and apparatus for expanding a bulb-shaped stamping into a one-piece door knob or the like by employing hydraulic pressure within the stamping, the expansion becoming complete substantially simultaneously with the closing of the die.

Another object is to provide a new and improved method and apparatus for accurately sizing the interior of the neck of the bulb-shaped stamping prior to the operation of expansion under a hydraulic pressure in order that the hydraulic plunger may accurately fit the interior of the neck portion.

Other and more detailed objects and advantages will appear hereinafter.

In the drawings:

Figures 1 to 11 illustrate diagrammatically the sequence of steps we employ in forming a one-piece door knob from a flat sheet of material. Thus, the flat sheet shown in Figure 1 is drawn to form a cup in Figure 2, and this cup is deepened in the steps shown in Figures 3 and 4. The flange on the cup shown in Figure 4 is removed to produce the cup shown in Figure 5, and an annealing operation normally takes place after the formation of the cup shown in Figure 5. The annealed cup of the shape shown in Figure 5 is then necked down in conventional dies in sequence as shown in Figures 6, 7, 8 and 9. The bulb-shaped stamping shown in Figure 9 is then processed in accordance with our invention to produce the bulbous part shown in Figure 10 which has a smooth ironed bore of accurate size within the neck portion. The part shown in Figure 10 is then expanded hydraulically in accordance with our invention to produce the finished door knob shown in Figure 11.

Figures 12 to 18 illustrate the method and apparatus for forming the part shown in Figure 10 from the part shown in Figure 9. Figure 12 is a sectional view showing a preferred form of apparatus for simultaneously reducing the neck portion of the bulbous part and for ironing the internal diameter of the neck, the parts being shown at the beginning of the operative stroke of the press. Figure 13 is a view similar to Figure 12 with the parts shown in position corresponding to movement of the press platen partway through its stroke. Figure 14 is a fragmental sectional elevation showing the action of the mandrel in ironing the internal bore of the neck of the bulbous part. Figure 15 is a view similar to Figure 13 showing the position of the parts corresponding to the end of the operative stroke of the press platen. Figure 16 is a sectional elevation partly broken away taken substantially on the lines 16—16 as shown in Figure 12. Figures 17 and 18 are transverse sectional views taken substantially on the lines 17—17 and 18—18 respectively as shown in Figure 13.

Figures 19 to 27 relate to the method and apparatus for hydraulically expanding the bulbous part shown in Figure 10 to produce the completed door knob shown in Figure 11. Figure 19 is an elevation partly in section showing parts in initial position before the movement of the press platen commences. Figure 20 is a sectional detail partly broken away showing the action of the hydraulic plunger in expanding the bulbous part before the die set reaches closed position. Figure 21 is a sectional view on an enlarged scale showing the die set in closed position and showing the construction of the hydraulic plunger. Figure 22 is a view similar to Figure 21 illustrating the final position of the parts corresponding to the end of the stroke of the press platen. Figures 23 and 24 are sectional elevations illustrating the action of the lock means employed for locking the upper and lower halves of the die set together against separation by the hydraulic pressure. Figure 23 shows the position of the locking parts corresponding to the position of the die set shown in Figure 20, and Figure 24 shows the parts in locked position corresponding to the position of the die set shown in Figures 21 and 22. Figure 25 is a plan view looking upwardly as shown by the lines 25—25 in Figure 19, partly in section and showing the parts of the locking mechanism. Figure 26 is a sectional view partly broken away taken substantially on the lines 26—26 as shown in Figure 24. Figure 27 is a sectional plan view partly broken away taken substantially on the lines 27—27 as shown in Figure 21.

Figures 28 and 29 are sectional views showing a modified form of apparatus for the hydraulic expansion of the bulbous part.

Figure 30 is a sectional plan view partly broken away taken substantially on the lines 30—30 as shown in Figure 29.

Referring to the drawings, the die set and associated parts shown in Figures 12–18 are used in making the bulbous part 10 shown in Figure 10 from the necked cup 9 shown in Figure 9. The five operations for producing the parts shown in each of Figures 6–10 are preferably performed in sequence in a dial feed press. In addition, a pre-oiling operation and an extracting operation may be performed in the same press. The part 9 is placed upright within the lower die 11 so that the necked portion extends upwardly in axial alignment with the punch 12 and with the upper die 13. The lower die 11 is retained by means of a die holder 14 secured to an axially immovable base or fixed platen 15. A plunger 16 is slidably mounted within a bore 17 in the fixed platen 15 so that the lower die 11 may move relative to the fixed platen 15 under certain conditions described below. The upper die 13 is provided with a flared central opening 18 at its lower end which joins a cylindrical bore 19 which extends axially through the die 13. The die holder 20 is connected to the die 13 by means of threaded elements 21 and a die holder sleeve 22 encircles the die 13 and the die holder 20. The die holder 20 is anchored with respect to the moving platen 23 by means of threaded elements 24. The upper portion of the die holder 20 is provided with a transverse axially extending slot 25 which receives the sliding crosshead 26 which carries the punch 12. A pair of stop rods 27 is fixed at the ends of the crosshead 26 and extends downwardly on opposite sides of the die holder sleeve and is arranged to contact the upper surface of the lower die holder 14 at one stage in the operative cycle.

A retaining ring 28 is provided with a central opening shaped to fit the contour of the part 9 at the large end of its tapering portion and prevents bulging. This plate is carried on a plurality of screws 29 slidably mounted within the axially extending recesses 30 formed in the die sleeve 22. A plurality of compression springs 31 are received within other recesses 32 formed in the die sleeve 22 and encircle upstanding pins 33 fixed on the plate 28. From this description it will be understood that the retaining ring 28 is normally moved downwardly by means of the coil springs 31 and the limit of its downward movement is fixed by engagement of the heads of the cap screws 29 with shoulders at the lower ends of the recesses 30. As the die 13 moves downwardly during the operating cycle the retaining ring 28 rests on the upper end of the lower die 11 and remains stationary while the upper die 13 moves downwardly.

As the moving platen 23 moves downwardly under influence of the moving platen of the punch press (not shown), the retaining ring 28 moves over the upper end of the part 9 and the punch 12 enters the upper open end of the necked portion of the part 9. It will be observed that the largest diameter of the punch 12 is smaller than the smallest diameter of the interior of the part 9 so that the punch enters without difficulty. Continued downward movement of the moving platen 23 and die 13 brings the flared lower end 18 of the die into contact with the upper necked portion of the part 9 with the result that the necked portion is further reduced in diameter as shown in Figure 13. Downward movement of the punch 12 and cross-head 26 is arrested at the instant that the lower ends of the stop rods 27 engage the upper surface of the lower die holder 14. Further downward movement of the platen 23 and die 13 is made possible by the release of latch means generally designated 35 which allows the lower die 11 to move downwardly with respect to the axially immovable platen 15. The latch means may include a latching lever 36 pivotally connected at 37 between a pair of stationary brackets 38. These brackets may be secured to the platen 15 by means of threaded elements 39.

A roller 40 mounted on the plunger 16 cooperates with a nose portion 41 on the latching lever so that clockwise movement of the lever as viewed in Figures 12, 13 and 15 serves to permit descent of the plunger 16 and lower die 11. A tension spring 42 secured at one end to the lever 36 and at the other end to the pin 43 on bracket 38 serves normally to hold the latching lever 36 in the position shown in Figure 12. A vertical tripping bar 44 is slidably mounted with respect to the platen 15 and is resiliently supported by means of a coil spring 45 acting on cross-pin 46. A cap screw 47 may be threaded into a recess 48 provided in the upper platen 23 and held in adjusted position by means of a lock nut 49. The spring 45 normally maintains the upper end of the trip rod 44 in contact with the head of the cap screw 47. The lower end 50 of the trip rod 44 is adapted to contact the outer end of the latching lever 36 upon descent of the upper platen 23. The position of the cap screw 47 is adjusted on the platen 23 so that the lower end 50 of the trip rod 44 releases the latching lever 36 at the instant that the upper die 13 comes in contact with the relatively stationary retaining ring 28.

Upon release of the latching device 35 the lower die 11 moves downwardly under the force applied by the upper die 13 acting through the retaining ring 28. The necking is completed when die 13 contacts ring 28—further downward movement performs the ironing operation described below. A plurality of parallel pins 51 is slidably mounted in the brackets 38, and at their upper ends these pins contact the plunger 16 and at their lower ends rest on an annular plate 52 encircling a stationary bolt 53 carried by the brackets 38. A compression spring 54 encircles the bolt and is confined between the plate 52 and the nut 55. The function of the spring 54 is to return the plunger 16 and lower die 11 back to the initial position shown in Figure 12 after completion of the operative cycle.

It will be observed in Figure 13 that the upper die 13 acts to reduce the diameter of the neck of the part 9 to such an extent that the inner diameter of the neck is smaller than the diameter of the cylindrical surface 56 on the punch 12. Accordingly, when the latch mechanism 35 is released to allow the lower die 11 to move downwardly with respect to the platen 15, the bulbous part 9 is carried downwardly with respect to the punch 12. In other words, the relative movement between the descending part 9 and the stationary punch 12 is such that the cylindrical surface 56 reduces the wall thickness of the neck of the part 9 in an "ironing" operation. Thus, the necking die 13 moves the part 9 downwardly, stripping it over the enlarged portion 56 of the punch 12 while confining the outer diameter of the neck. The result is that a smooth cylindrical dense surface 57 is produced on the inner diameter of the neck of the part 9, and this surface 57 is exceptionally uniform and accurate in diameter. Figure 14 shows the ironing process when partly completed, and Figure 15 shows the position of the parts upon completion of the ironing.

The punch 12 is provided with a segmental expansion ring 58 which may comprise a plurality of ring segments 59 mounted within a groove 60 formed on the punch 12 below the location of the cylindrical surface 57. A dished washer 61 acts as a spring and urges the retaining ring 62 to move upwardly so that the ring segments 59 are caused to move radially outwardly by the conical surface 63 formed on the punch 12. The hub 64 may be fastened on the punch 12 by means of a pin 65. The segmental expansion ring 58 has a maximum diameter which will pass into the open end of the part 9 when it is initially inserted in the lower die 11. However, when the upper or necking die 13 further contracts the neck of the part 9 around the punch 12 as shown in Figure 13, the contracted inner diameter of the neck of the part 9 is smaller than the diameter of the cylindrical surface 57. The ring segments 59 are contracted by contact with the inner wall of the neck of the part 9 and hence the segmental ring 58 offers no resistance during the ironing operation illustrated in Figure 14. When the ironing operation is complete, however, and when the segmental ring 58 moves out of the confinement of the neck of the part 9, the ring segments 59 expand under the influence of the resilient annular washer 61 and overlie the upper end 66 of the part 9. This relationship is shown in Figure 15.

When the platen 23 moves upwardly on the return part of the stroke, the ironing die 13 moves upwardly with the platen and the ironed part now designated 10 sticks in the upper die 13 by reason of the tight fit of the neck therein following the ironing operation. As the platen 23 moves upwardly the plunger 16 carries the lower die 11 back toward its initial position under the action of the compression spring 54 acting through pins 51.

Spring 69 is mounted on the moving platen of the press and by initial compression and through the pin 67 applies a continuously downward force on the crosshead 26. This is effective to cause ejection of the workpiece at the start of the upward movement of the platen leaving the workpiece in the lower die 11, from which it is removed at the next station of the dial piece (not shown). The plate 68 may be interposed between the spring 69 and pin 67 and the spring may be enclosed within the shell 70.

This completes the operations on the bulbous part 10 and it is then ready to be expanded hydraulically to form the completed door knob illustrated in Figure 11.

Referring to Figures 19–27, the bulbous part 10 having the accurately sized cylindrical surface 57 is placed in another die assembly for hydraulic expansion. This die assembly includes a lower die 80 and an upper mating die 81. A movable plunger 82 extends axially through the central opening in the upper die 81. This plunger 82 is provided with an accurately sized cylindrical sealing surface 83 which fits closely within the surface 57 and provides a sealing fit therewith. The lower end of the plunger is reduced in size and provided with wrench flats 84 enabling the plunger to be turned for engaging the threaded connection 85. The threaded connection 85 connects the upper end of the plunger 82 to the bushing 86 slidably mounted within the central bore 87 formed in the upper die holder 88. The bore 87 terminates in an annular shoulder 89. A coaxial bore 90 extends upwardly from the lower part of the die holder 88 and terminates in a shoulder 91. A coaxial cylindrical bore 92 of reduced diameter connects the shoulders 89 and 91. A flange 93 on the bushing 86 is adapted to engage the annular shoulder 89 to arrest downward movement of the bushing 86 and plunger 82. An ejector sleeve 94 encircles the upper portion of the plunger 82 and is provided with a flange 95 at its upper end. This flange is adapted to engage the annular shoulder 91 to limit upward movement of the sleeve 94. A plurality of parallel ejector pins 99 extend axially through the moving platen 96 and die holder 88 and extend through apertures 97 and 98 so that their lower ends rest on the flange 95 of the sleeve 94.

The apertures 97 are formed in the bushing 100 which is screwed into a threaded counterbore 101 formed in the upper portion of the upper die holder 88. An ejector stem 102 extends through a central opening 103 provided in the bushing 100 and extends upwardly into an axial recess 104 provided in the moving platen 96. The upper end of the ejector stem 102 engages an annular shoulder 107 provided at the end of the recess 104. A bumper element 108 is slidably mounted within an axial bore 109 provided in the upper platen 96 and rests on the upper ends of the ejector pins 99. The upper end of the bumper element 108 extends upwardly out of the bore 109 for contact with a stationary bar (not shown).

The lower die 80 is provided with a central cylindrical bore 110 and a counterbore 111 at the lower end thereof. An indenting button 112 is slidably received within the bore 110 and is provided with a flange portion 113 which fits within the counterbore 111. A lower die holder plate 114 is secured to the lower die 80 by any convenient means (not shown), and this die holder plate is received within a recess 115 provided in the lower or fixed platen 116. An axial stud 117 threaded into the platen 116 carries a nut 118 which supports a pair of plates 119 and 120 having a rubber disk 121 positioned therebetween. Compression pins 122 extend axially through openings provided in the lower platen 116 so that the lower die holder plate 114 rests on the upper end of the pins 122 and so that the lower ends of these pins rest on the plate 119. The arrangement is such that downward movement of the lower die 80 is permitted by squeezing of the rubber disk 121. Such downward movement of the lower die 80 is limited by engagement of the die holder plate 114 with the bottom of the recess 115.

The button 112 does not move downwardly with the lower die holder 114, but on the contrary is supported on stationary pins 123 which are slidably mounted within the die holder plate 114 and which rest on a stationary insert 124 carried by the lower fixed platen 116.

As shown in Figure 25 the upper die 81 is secured to the die holder 88 by means of clips 146 on opposite sides of the die 81. These clips engage within an annular groove 147 formed on the die 81, and they are secured to the die holder 88 by means of headed cap screws 148 which pass through slots 149 in the clips.

Means are provided for releasably locking the moving platen with respect to the stationary platen in order to maintain the dies 80 and 81 in closed position. As shown in the drawings this means includes a series of hook elements 125 which are secured to base pieces 126 by means of anchor pins 127. The base pieces 126 are secured to the lower stationary platen 116 by any convenient means such as, for example, the cap screws 128 (see Figure 26). A series of bracket elements 129 are secured to the upper die holder 88 by means of lock pins 130. A series of pusher elements 131 are secured to base members 132 by means of lock pins 133, and the base members 132 are in turn secured to the moving platen 96 by any convenient means such as, for example, the cap screws 134. Briefly stated, the series of hook elements 125 are secured relative to the lower platen, the series of bracket elements are secured relative to the upper die holder 88, and the series of pusher elements 131 are secured relative to the upper moving platen 96.

The upper die holder 88 is mounted for a relative sliding movement with respect to the upper platen 96. A horizontally extending recess 135 is formed on the underside of the platen 96 and is adapted to receive the upper die holder 88. Guide pins 136 are fixed in the platen 96 and are slidably mounted with respect to the upper die holder 88 to guide the latter in its movement relative to the platen 96. Parallel bolt elements 137 are threaded into the platen 96 and are slidably received within openings 138 provided on the upper die holder 88. Coil springs 139 encircle the elements 137 within the openings 138 and act against an enlarged head 140 on the lower end of each of the elements 137. The upper end of each of the coil springs 139 engages an annular shoulder 141 on the upper die holder. The action of the springs 139 is to move the upper die holder 88 upwardly into the recess 135. This action normally is prevented by locking bars 142 and rollers 143. The bars 142 extend along each series of latching elements 125, 129 and 131 as shown clearly in Figures 25 and 26. The rollers 143 turn freely on the bars 142, and in the position shown in Figure 19 act to prevent upward movement of the upper die holder 88 with respect to the moving platen 96. As shown in Figure 19, the rollers 143 are interpositioned between horizontal abutments 144 provided on the bracket elements 129 and horizontal abutments 145 provided on the pusher elements 131. The locking bars 142 remain in the position shown in Figure 19 until the moving platen 96 and its associated parts move downwardly a sufficient distance to move the cylindrical portion 83 of the plunger 82 into the upper end of the bulbous work piece 10. At that time the rollers 143 engage within the curved slots 150 and the rollers 143 and bars 142 are moved outwardly away from the die holder 88 so that they move out from under the shoulders 145 and are in position to enter the slots 151 in the pusher elements 131.

Lateral movement of the bars 142 and rollers 143 to release the locking action between the die holder 88 and the platen 96 is completed at the instant that the upper die 81 reaches closed position with respect to the lower die 80 as illustrated in Figure 21. Further downward movement of the platen 96 forces the plunger 82 downwardly, but the die holder 88 and upper die 81 remain relatively stationary, with the die holder 88 entering the recess 135 in the platen 96. The curved slots 150 on the hook elements 125 cause the rollers 143 to move under the shoulders 152 on the hook elements so that separation of the dies 80 and 81 under hydraulic pressure within the die cavities is effectively prevented.

From this description it will be understood that the function of the locking parts 125, 129, 131 and 143 is threefold: (a) to lock the die holder 88 with respect to the platen 96 for a portion of the stroke of the platen 96; (b) to release the die holder 88 with respect to the platen 96 when the upper die 81 and lower die 80 meet in contact; and (c) to lock the upper platen 96 with respect to the lower platen 115 to prevent separation of the dies 80 and 81 while the bulbous part 10 is being hydraulically expanded into contact with the closed die cavity.

In operation the bulbous work piece 10 is filled with hydraulic fluid. This fluid may be water or water with a suitable additive such as, for example, soap. Upon downward movement of the platen 96 the plunger 82 traps a predetermined quantity of hydraulic fluid within the interior of the bulbous part 10. The form of hexagonal end 84 of the plunger may be made just the proper length to trap the desired quantity of hydraulic fluid when the cylindrical surface 83 of the plunger enters into sealing contact with the cylindrical bore 57 in the neck of the bulbous part 10. The hydraulic fluid trapped within the interior of the part 10 expands the part under the influence of pressure developed by the plunger 82 as it moves into the interior of the part 10. The expansion operation begins substantially before the upper die 81 meets the lower die 80. This feature of the invention is illustrated in Figure 20 and constitutes an important advantage because it enables use of a larger bulbous part 10 in relation to the size of the finished door knob than would be the case if the dies were together before the expansion begins, requiring relatively less expansion of the bulb. When the upper and lower dies 81 and 80 meet in metal-to-metal contact along their engagement surfaces 153, the locating ring 154 on the upper die 81 encircles the cylindrical surface 155 on the lower die 80 and fits closely therewith.

As set forth above, engagement of the upper and lower dies 81 and 80 coincides with release of the lock between the upper die holder 88 and the moving platen 96. Continued downward movement of the moving platen 96 moves the plunger 82 from the position shown in Figure 21 to the position shown in Figure 22. The pressure developed within the interior of the work piece expands it into tight contact with the walls of the cavity generally designated 156. The shape of the top of the button 112 is therefore impressed into the wall of the work piece, and any corrugations or designs are thus faithfully reproduced on the work piece. The pressure developed within the interior of the work piece is relatively high and in practice has been found to be sufficiently great to separate the dies 80 and 81 along the surfaces 153, if no provision is made to lock the dies against separation. The action of the locking rollers 153 moving under the projection 152 on the hook elements 125 effectively prevents separation of the dies 80 and 81 under this relatively high unit pressure.

We have found it desirable to employ a spring loaded check valve assembly within the interior of the plunger 82 in order to allow excess hydraulic fluid to escape when the unit pressure exceeds a predetermined maximum. As shown in the drawings this check valve assembly generally designated 157 includes a ball 158 engaging conical seat 159 to close the opening 160. A follower 161 rests against the ball 158. A coil spring 162 is mounted within an axial bore 163 in the plunger 82. One end of this spring rests against the follower 161 and the other end contacts the threaded plug 164 which is positioned within the extreme upper end of the plunger 82. The plug 164 may be adjustably positioned along the threaded portion 165 of the bore 163 to vary the force exerted by the spring upon the follower 161. A passage 166 extends through the follower 161 so that any hydraulic fluid passing the ball check enters the bore 163. A central passage 167 is provided within the adjustable threaded plug 164. This passage communicates with port 168 within the bushing 86. An outlet for hydraulic fluid reaching the port 168 is provided by intersecting axial and radial openings 169 and 170 respectively positioned within the lower end of the ejector stem 102. Hydraulic fluid passing outwardly through the radial opening 170 passes into the bore 103 and outwardly to atmosphere through aligned ports 171 and 172 in the bushing 100 and die holder 88 respectively. The lower die 80 is held in its upper position, with the indenting button 112 in its retracted position to allow the bulb to stretch without dragging the metal across the circumferential indenting edge 112ª. The rubber disk 121 holds the lower die 80 in its upper position until it is moved downwardly by direct contact with the upper die 81.

When the moving platen 96 is retracted upwardly the lock bars 142 and lock rollers 143 move radially inwardly under the influence of the curved portions 173 on the pusher elements 131, thereby moving the rollers 143 out from under the abutments 152 on the hook elements 125. The locking parts are therefore returned to the position shown in Figure 19. Continued upward movement of the platen 96 separates the dies 80 and 81. The finished part then has the shape of the door knob shown in Figure 11. This part remains in the upper die 81 and moves upwardly therewith by reason of the relatively tight fit within the upper portions of the die cavity. When the moving platen 96 approaches the upper end of its stroke a stationary bar (not shown) strikes the upper end of the bumper element 108 and arrests its upward movement. This in turn stops the upward movement of the ejector pins 93 and the ejector sleeve 94. Since the lower end of the ejector sleeve 94 bears against the upper end of the completed door knob, the latter is stripped from the upper die 81 as it continues in its upward movement. A new bulbous blank 10 is filled with hydraulic fluid and placed in position and the cycle repeats.

The finished part as shown in Figure 11 has a cylindrical neck 180 provided with the smooth, accurate cylindrical bore 57. The surface of the metal of the bore 57 is dense and smooth and round by reason of the processing operations above described. The metal thickness of the curved belled portion 181 is thicker than that of the neck 180 and of the fully expanded bulb portion 182 because the intermediate belled portion 181 has been subjected neither to the ironing operation nor to the maximum expansion by hydraulic pressure. There are no machine marks on the interior or the exterior of the neck because no machining operations are employed, and accordingly there are no regions of high stress concentration in the area where the intermediate belled portion 181 joins the neck 180. The length of the neck 180 may be trimmed as desired or it may be left exactly as it comes from the hydraulic expansion dies. In any event, it is unnecessary to bore, ream or otherwise process the neck 180 before joining it to an inner sleeve for operating the lock mechanism of a door latch. The finished door knob itself, therefore, has attributes above and beyond its method of manufacture. The relatively thick wall of the belled portion 181 is particularly advantageous because it is in this region that the highest stresses occur during the service life of the door knob. These stresses tend to concentrate in this belled portion 181 by reason of the twisting effort applied to the door knob, as well as to lateral forces occasioned by rough usage.

Referring to the modified form of our invention shown in Figures 28 to 30, the upper and lower dies 200 and 201 cooperate when closed to form a cavity of the desired shape. A bulbous part 10 as shown in Figure 10 of the drawings is placed on the lower die and filled with hydraulic fluid. The part is then hydraulically expanded to the shape of the die cavity in the manner outlined above. This embodiment of our invention, however, does not employ lock means for preventing separation of the upper and lower dies and the rubber ring is mounted on the upper die assembly instead of the lower one. As shown in Figure 28 the lower die 201 may be bolted directly to the fixed platen 202 by means of the cap screws 203 and hold-down ring 204. The upper die 200 is fixed to die holder 205 by means of cap screws 206 and ring 207. An annular rubber disk 208 is confined between the holder 205 and the plate 209 by means of threaded elements 210. These threaded elements extend through aligned openings in the plate 209 and rubber disk 208 and are threaded at 211 into the upper die holder 205. The plunger 212 may be constructed substantially the same as that previously described and is encircled by the ejector sleeve 213. Parallel ejector pins 214 rest on the flange at the upper end of the ejector sleeve 213 and at their upper ends engage a flange 215 on the lower end of the ejector stem 216. The plunger 212 is fixed relative to the upper platen 217 by means of a fixed plate 218. A check valve assembly 219 of substantially the same type previously described may be provided within the plunger 212.

In operation the plunger 212 enters the cylindrical bore 57 within the bulbous blank 10 and hydraulic expansion of the part begins before the dies 200 and 201 meet in metal-to-metal relationship. In other words, the expansion begins before the die cavity is closed. The expanding part fills the die cavity at substantially the time that the upper and lower dies 200 and 201 meet in contact. Continued downward movement of the platen 217 moves the plunger 212 further downwardly into the interior of the expanded part, causing it to conform accurately to the shape of the walls of the die cavity. This additional movement of the plunger 212 after the relative movement of the dies 200 and 201 has been arrested is made possible by the resilience of the rubber ring 208. Excessive hydraulic pressure results in escape of hydraulic fluid through the ball check assembly 219 and out through the port 220 to atmosphere. When the moving platen 217 is retracted upwardly the completed door knob remains with the upper die 200 until the upper end of the ejector stem 216 strikes a stationary part (not shown). At this time the ejector 214 and the ejector sleeve 213 remain stationary while the upper die 200 continues its upward movement. The finished part is thereby stripped from the upper die 200. A new bulbous blank 10 may then be inserted and filled with hydraulic fluid for repetition of the cycle.

Having fully described our invention, it is to be understood that we do not wish to be limited to the details herein set forth, but our invention is of the full scope of the appended claims.

We claim:

1. The method of forming a door knob from a necked cup having an expandable bulbous portion, comprising: ironing the inside surface of the neck of the cup while the outside surface thereof is confined against lateral expansion to produce a smooth cylindrical inside surface of uniform diameter and final predetermined size, introducing liquid into said necked cup for use in hydraulically expanding the bulbous portion thereof, utilizing the interior surface of the neck portion as a means for effecting a seal with a pressure applying member to confine the liquid in the cup, applying pressure to said liquid while supporting at least a portion of the exterior of said neck against deformation to thereby start the expansion of the bulbous portion and simultaneously with and during further expansion of said bulbous portion, applying external pressure to reshape the exterior of the expanded bulbous portion to the final desired shape.

2. The method of forming a door knob from a blank comprising a single integral shell having a large expandable bulbous part including an elongated substantially cylindrical side wall and a bottom wall, a relatively small coaxial cylindrical neck, and an intermediate flaring portion integrally joining the lower end of the cylindrical neck and the upper end of the cylindrical side wall of the bulbous portion, the neck being of substantially uniform diameter from the upper end of said flaring portion to its outermost extremity and having smooth cylindrical interior and exterior surfaces of final finished size, comprising: providing a predetermined volume of liquid in said blank at least sufficient to hydraulically expand the bulbous portion of the blank to the shape desired, utilizing the interior surface of the finished neck portion as a means for effecting a seal with a pressure applying plunger of predetermined diameter, while supporting the neck portion against lateral expansion to thus confine said liquid in said blank, applying pressure to the liquid by moving said plunger into said blank to start expansion of said bulbous portion, and after partial expansion of said bulbous portion and simultaneously with and during further expansion of said bulbous portion, applying external pressure to reshape the exterior of the expanded bulbous portion to the final desired shape.

3. The method of forming a door knob from a blank comprising a single integral shell having a large expandable bulbous part including an elongated substantially cylindrical side wall and a bottom wall, a relatively small coaxial cylindrical neck, and an intermediate flaring portion integrally joining the lower end of the cylindrical neck and the upper end of the cylindrical side wall of the bulbous portion, the neck being of substantially uniform diameter from the upper end of said flaring portion to its outermost extremity and having a smooth cylindrical interior and exterior surface of final finished size, comprising: supporting the blank upon a first die member having a die cavity, introducing liquid into said blank for use in hydraulically expanding the bulbous portion thereof, simultaneously moving a second die member having a die cavity, and a plunger, into engagement with said blank, utilizing the interior surface of the finished neck portion as a means for effecting a seal with said plunger while supporting the outer surface of said neck by said second die member to prevent lateral expansion thereof, moving said second die member and plunger toward the first die member to effect initial expansion of the bulbous portion of the blank while the die members are still spaced apart, and continuing the movement of said die members toward each other during further expansion of said bulbous portion to apply pressure to reshape the exterior of the expanded bulbous portion to a final desired shape determined by said die cavities.

4. The method of expanding a blank having a single integral shell including a small cylindrical neck, and a coaxial relatively large expandable bulbous portion provided with an elongated substantially cylindrical side wall, a bottom wall, and a flared portion integrally joining the cylindrical neck and the upper end of the cylindrical side wall of said bulbous portion, the neck being hard and dense and having smooth cylindrical inside and outside surfaces of final predetermined size, the side and bottom walls of the bulbous portion being relatively soft and in a stress-relieved state, comprising the steps of: positioning said blank between open die parts; providing a metered amount of liquid in said blank at least sufficient in volume to hydraulically expand the bulbous portion of said blank to the shape desired; starting closing of the die parts while applying pressure to said liquid by a plunger of predetermined diameter slidably extending through said neck; utilizing the smooth inside surface of said neck to form a seal with said plunger and supporting the smooth outside surface of said neck against enlargement to thus confine said liquid to start expansion of said bulbous portion; and simultaneously with and during the further expansion of said bulbous portion, continuing to completion the closing of said die parts to apply external pressure to said expanded bulbous portion to reshape the exterior thereof to a final desired shape conforming to said die parts.

5. The method of expanding a blank having a single integral shell including a small cylindrical neck, and a coaxial relatively large expandable bulbous portion provide with an elongated substantially cyindrical side wall, a bottom wall, and a flared portion integrally joining the cylindrical neck and the upper end of the cylindrical side wall of said bulbous portion, the neck being hard and dense and having smooth cylindrical inside and outside surfaces of final predetermined size, the side and bottom walls of the bulbous portion being relatively soft and in a stress-relieved state, comprising the steps of: positioning said blank between open die parts; substantially completely filling the blank with liquid, displacing a portion of the liquid from said blank by introducing a plunger, of a predetermined diameter and having a reduced end of predetermined volume, into the neck of said blank to leave a relatively predetermined amount of liquid in said blank at least sufficient in volume to expand the bulbous portion of said blank to the shape desired; starting closing of the die parts while applying pressure to said liquid by said plunger; utilizing the smooth inside surface of said neck to form a seal with said plunger and supporting the smooth outside surface of said neck against enlargement to thus confine said liquid to start expansion of said bulbous portion; and simultaneously with and during the further expansion of said bulbous portion, continuing to completion the closing of said die parts to apply external pressure to said expanded bulbous portion to reshape the exterior thereof to final desired shape conforming to said die parts.

6. The method of expanding a blank having a single integral shell including a small cylindrical neck, and a coaxial relatively large expandable bulbous portion provided with an elongated substantially cylindrical side wall, a bottom wall, and a flared portion integrally joining the cylindrical neck and the upper end of the cylindrical side wall of said bulbous portion, the neck being hard and dense and having smooth cylindrical inside and outside surfaces of final predetermined size, the side and bottom walls of the bulbous portion being relatively soft and in a stress-relieved state, comprising the steps of: providing a metered amount of liquid in said blank at least sufficient in volume to expand the bulbous portion of said blank to the shape desired; contacting a close fitting plunger with the inside surface of said neck to form a seal therewith and supporting the outside surface of said neck against enlargement to thereby confine the liquid in said bulbous portion, and moving said plunger inwardly while said bulbous portion is unconfined to apply pressure to said liquid in said blank to start expanding said bulbous portion to thereby increase the volumetric content thereof, and then die-shaping the exterior of the bulbous portion by closing a die cavity thereabout to confine and shape said bulbous portion while continuing the expansion thereof, whereby to limit the shape of said bulbous portion to a predetermined maximum size and shape conforming to said die cavity.

7. The method of expanding a blank having a single integral shell including a small cylindrical neck, and a coaxial relatively large expandable bulbous portion provided with an elongated substantially cylindrical side wall, a bottom wall, and a flared portion integrally joining the cylindrical neck and the upper end of the cylindrical side wall of said bulbous portion, the neck being hard and dense and having a smooth cylindrical outside surface and an ironed inner surface of final predetermined size, the side and bottom walls of the bulbous portion being relatively soft and in a stress-relieved state, comprising the steps of: providing a metered amount of liquid in said blank at least sufficient in volume to expand the bulbous portion of said blank to the shape desired; confining said outer surface of said neck against enlargement; contacting a close fitting plunger with the ironed inner surface of said neck to form a seal therewith to thereby confine the liquid in said bulbous portion, and moving said plunger inwardly to apply pressure to said liquid in said blank to start expansion of said bulbous portion to increase the volumetric content thereof, and then die-shaping the exterior of the bulbous portion by closing a die cavity thereabout to confine and shape said bulbous portion to limit it to a predetermined maximum size and shape while continuing movement of said plunger to expand said bulbous portion.

References Cited in the file of this patent

UNITED STATES PATENTS

| Number | Name | Date |
|---|---|---|
| 126,610 | Wood | May 7, 1872 |
| 222,251 | Dackus | Dec. 2, 1879 |
| 748,404 | Munro | Dec. 29, 1903 |
| 788,119 | Pope | Apr. 25, 1905 |
| 795,020 | Barthelmes | July 18, 1905 |
| 1,503,023 | Carlson | July 29, 1924 |
| 1,766,098 | Booth | June 24, 1930 |
| 2,006,691 | Giesler | July 2, 1935 |
| 2,129,120 | Davis | Sept. 6, 1935 |
| 2,128,614 | Kobayashi | Aug. 30, 1938 |
| 2,138,199 | Wendel | Nov. 29, 1938 |
| 2,157,044 | Wendel | May 2, 1939 |
| 2,238,212 | Cornell | Apr. 15, 1941 |
| 2,284,773 | Sivian et al. | June 2, 1942 |
| 2,312,749 | Bullock | Mar. 2, 1943 |
| 2,354,005 | Flowers | July 18, 1944 |
| 2,407,855 | Stephens | Sept. 17, 1946 |
| 2,493,053 | Zatyko | Jan. 3, 1950 |
| 2,582,358 | Schoellerman | Jan. 15, 1952 |
| 2,592,867 | Cuq | Apr. 15, 1952 |

FOREIGN PATENTS

| Number | Country | Date |
|---|---|---|
| 4,494 | France | June 14, 1906 |

OTHER REFERENCES

The book "Die Design and Die Making Practice," edited by F. D. Jones, 2nd ed., published by the Industrial Press, pp. 843–851. (Copy in Div. 14.)